US008640041B2

(12) United States Patent
Miyata

(10) Patent No.: US 8,640,041 B2

(45) Date of Patent: Jan. 28, 2014

(54) DISPLAY CONTROL APPARATUS AND PROGRAM FOR INDICATING RESTRICTION GROUPS

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 408 days.

(21) Appl. No.: 12/390,765

(22) Filed: Feb. 23, 2009

(65) Prior Publication Data

US 2009/0228822 A1 Sep. 10, 2009

(30) Foreign Application Priority Data

Mar. 10, 2008 (JP) ................................ 2008-059639

(51) Int. Cl.
*G06F 3/048* (2013.01)

(52) U.S. Cl.
USPC .......................................... 715/777; 715/771

(58) Field of Classification Search
USPC ................................. 715/821, 777, 221, 771
See application file for complete search history.

(56) References Cited

U.S. PATENT DOCUMENTS 5,754,179 A * 5/1998 Hocker et al. ................ 715/835
5,920,313 A * 7/1999 Diedrichsen et al. ......... 715/767
2001/0030755 A1* 10/2001 Yamade ......................... 358/1.1
2003/0023641 A1* 1/2003 Gorman et al. ............... 707/530
2003/0053113 A1* 3/2003 Nishikawa et al. .......... 358/1.14
2003/0150909 A1* 8/2003 Markham et al. ............. 235/376
2003/0214671 A1* 11/2003 Bos et al. ..................... 358/1.15
2004/0001114 A1* 1/2004 Fuchs et al. .................. 345/855
2004/0073868 A1* 4/2004 Easter et al. .................. 715/507
2004/0189708 A1* 9/2004 Larcheveque et al. ........ 345/780
2005/0099645 A1 5/2005 Saito et al.
2005/0182773 A1* 8/2005 Feinsmith ..................... 707/100
2007/0226650 A1* 9/2007 Hintermeister et al. ...... 715/822
2010/0174558 A1* 7/2010 Smith et al. ....................... 705/3

FOREIGN PATENT DOCUMENTS

EP 0 873 001 10/1998
JP 09-098278 4/1997
JP 09-198191 7/1997

(Continued)

OTHER PUBLICATIONS

Kim, Help with Validation Errors, Forum: Ruby on Rails, available at http://www.ruby-forum.com/topic/94993 (Jan. 22, 2007).*
EP Extended EP Search Report dtd Sep. 27, 2010, EP Appln. 09003219.4.

(Continued)

*Primary Examiner* — Doon Chow
*Assistant Examiner* — Conrad Pack
(74) *Attorney, Agent, or Firm* — Banner & Witcoff, Ltd.

(57) ABSTRACT

A display control apparatus is provided. The apparatus includes a display control unit which controls a display to display a setting screen indicating a plurality of set items, a setting unit which sets setup values for the plurality of set items, respectively, a processing unit which executes processing according to a combination of the set setup values, and a restriction unit which restricts setting the setup values by the setting unit so as not to satisfy a restriction condition, which is a combination of a plurality of setup values. The display control unit controls the display to display a restriction item group in a first mode, the restriction item group including set items corresponding to the setup values in the restriction condition, and to display set items other than the restriction item group in a second mode different from the first mode.

9 Claims, 10 Drawing Sheets

(56) References Cited

FOREIGN PATENT DOCUMENTS

| | | |
|---|---|---|
| JP | 10-222328 | 8/1998 |
| JP | 10-304120 | 11/1998 |
| JP | 2000-112685 | 4/2000 |
| JP | 2000-267509 | 9/2000 |
| JP | 2001-075694 | 3/2001 |
| JP | 2005-063113 | 3/2005 |
| JP | 2005-174121 | 6/2005 |
| JP | 2007-058563 | 3/2007 |
| JP | 2007-133675 | 5/2007 |
| JP | 2007-142638 | 6/2007 |

OTHER PUBLICATIONS

CN Office Action dtd Dec. 9, 2010, CN Appln. 200910126954.6, English translation.

Japanese Office Action received, Notification of Reasons for Refusal for counterpart JP Application No. 2008-059639, mailed Jan. 5, 2010.

CN Office Action in corresponding Application No. 200910126954.6; dated Jun. 5, 2012.

Office Action Received in corresponding Chinese Patent Application No. 200910126954.6, dated Nov. 22, 2011.

* cited by examiner

FIG. 2A

| | RESTRICTION |
|---|---|
| A | DOUBLE-SIDED PRINT ON AND SHEET SIZE LESS THAN A4 |
| B | DOUBLE-SIDED PRINT ON AND POSTER PRINT ON |
| C | SHEET SIZE LESS THAN A4 AND TRAY OTHER THAN MANUAL TRAY |

FIG. 2B

| NO. | RESTRICTION CONDITION | | RESTRICTION SET ITEM GROUP | DISPLAY COLOR |
|---|---|---|---|---|
| | CONDITION SETUP VALUE | RESTRICTION SETUP VALUE | | |
| 1 | DOUBLE-SIDED PRINT ON | SHEET SIZE LESS THAN A4<br>POSTER PRINT ON | DOUBLE-SIDED PRINT<br>SHEET SIZE<br>POSTER PRINT | RED |
| 2 | SHEET SIZE LESS THAN A4 | DOUBLE-SIDED PRINT<br>TRAY OTHER THAN MANUAL TRAY | SHEET SIZE<br>DOUBLE-SIDED PRINT<br>SHEET FEED TRAY | GREEN |
| 3 | POSTER PRINT ON | DOUBLE-SIDED PRINT ON | POSTER PRINT<br>DOUBLE-SIDED PRINT | BLUE |

| ITEM | SETTING |
|---|---|
| SHEET SIZE | A5 |
| DOUBLE-SIDED PRINT | OFF |
| POSTER PRINT | ON |
| SHEET FEED TRAY | MANUAL TRAY |

| SET ITEM | COLORING RESULT |
|---|---|
| SHEET SIZE | GREEN |
| DOUBLE-SIDED PRINT | GREEN, BLUE |
| POSTER PRINT | BLUE |
| SHEET FEED TRAY | GREEN |

| SET ITEM | SETUP VALUE | DISPLAY COLOR |
|---|---|---|
| SHEET SIZE | A4 | RED |
| DOUBLE-SIDED PRINT | ON | RED |
| POSTER PRINT | OFF | RED |
| SHEET FEED TRAY | TRAY 1 | – |

| ITEM | SETTING | DISPLAY COLOR |
|---|---|---|
| SHEET SIZE | A5 | GREEN |
| DOUBLE-SIDED PRINT | OFF | GREEN |
| POSTER PRINT | ON | – |
| SHEET FEED TRAY | MANUAL TRAY | GREEN |

DISPLAY CONTROL APPARATUS AND PROGRAM FOR INDICATING RESTRICTION GROUPS

CROSS-REFERENCE TO RELATED APPLICATION

This application claims priority from Japanese Patent Application No. 2008-059639, filed on Mar. 10, 2008, the entire subject matter of which is incorporated herein by reference.

TECHNICAL FIELD

Aspects of the present invention relate to a display control apparatus and a display control program.

BACKGROUND

An apparatus requests the user to set values for several items related to data processing in order to process data for print, and the like. In such apparatus, when the user sets arbitrary values for the items, processing corresponding to the set values cannot always be executed. That is, processing cannot be executed because a collision occurs between a setting on one item and a setting on another item. Therefore, the apparatus is adapted to prohibit the user from making such an item setting.

In the meantime, at the time, it may be hard for the user to understand why the setting cannot be made.

JP-A-H9-98278 describes the following two related-art techniques which resolve the difficulty of understanding. Firstly, it is assumed that when the user sets a value for one item, it becomes impossible to execute processing because of a collision of a setting on the item with a setting on another item. In this case, the other item is displayed so as to enable the user to see the other item at a glance. Secondly, it is assumed that as a value is set for one item, no selection can be made in the setting on another item. In this case, the setting is restricted so as to prohibit the user from setting a value for the other item.

However, the difficulty for the user to understand why the item setting is restricted still remains unresolved. The reason will be explained. In the related-art technique, when a value is set for one item, only display of another item changes or the setting on another item becomes impossible. Therefore, when the user sets the one item, the user needs to see carefully and remember which item has changed. Otherwise, the user does not understand which setting caused the change. Therefore, the difficulty for the user to understand why item setting is restricted is still unsolved.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly it is an aspect of the present invention to provide an apparatus and a program capable of informing the user of why item setting is restricted in more easily understandable manner.

According to an exemplary embodiment of the present invention, there is provided a display control apparatus comprising: a display control unit which controls a display to display a setting screen indicating a plurality of set items; a setting unit which sets setup values for the plurality of set items displayed on the display, respectively; a processing unit which executes processing according to a combination of the setup values set by the setting unit; and a restriction unit which restricts setting the setup values by the setting unit so as not to satisfy a restriction condition, which is a combination of a plurality of setup values, wherein the restriction condition is determined so as to prohibit the processing unit from executing the processing. The display control unit controls the display to display a restriction item group in a first mode, the restriction item group including set items corresponding to the setup values in the restriction condition, and to display set items other than the restriction item group in a second mode different from the first mode.

According to another exemplary embodiment of the present invention, there is provided a computer-readable medium having a computer program for controlling a display stored thereon and readable by a computer, the computer program, when executed by the computer, causing the computer to perform operations comprising: controlling the display to display a setting screen indicating a plurality of set items; setting setup values for the plurality of set items displayed on the display; executing processing according to a combination of the set setup values; and restricting setting the setup values by the setting operation so as not to satisfy a restriction condition, which is a combination of a plurality of setup values, wherein the restriction condition is determined so as to prohibit executing of the processing. The controlling controls the display to display a restriction item group in a first mode, the restriction item group including set items corresponding to the setup values in the restriction condition, and to display set items other than the restriction item group in a second mode different from the first mode.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIGS. 2A and 2B are tables to show restriction conditions;

DETAILED DESCRIPTION

Referring now to the accompanying drawings, there is described exemplary embodiments of the present invention.

Figure 1:
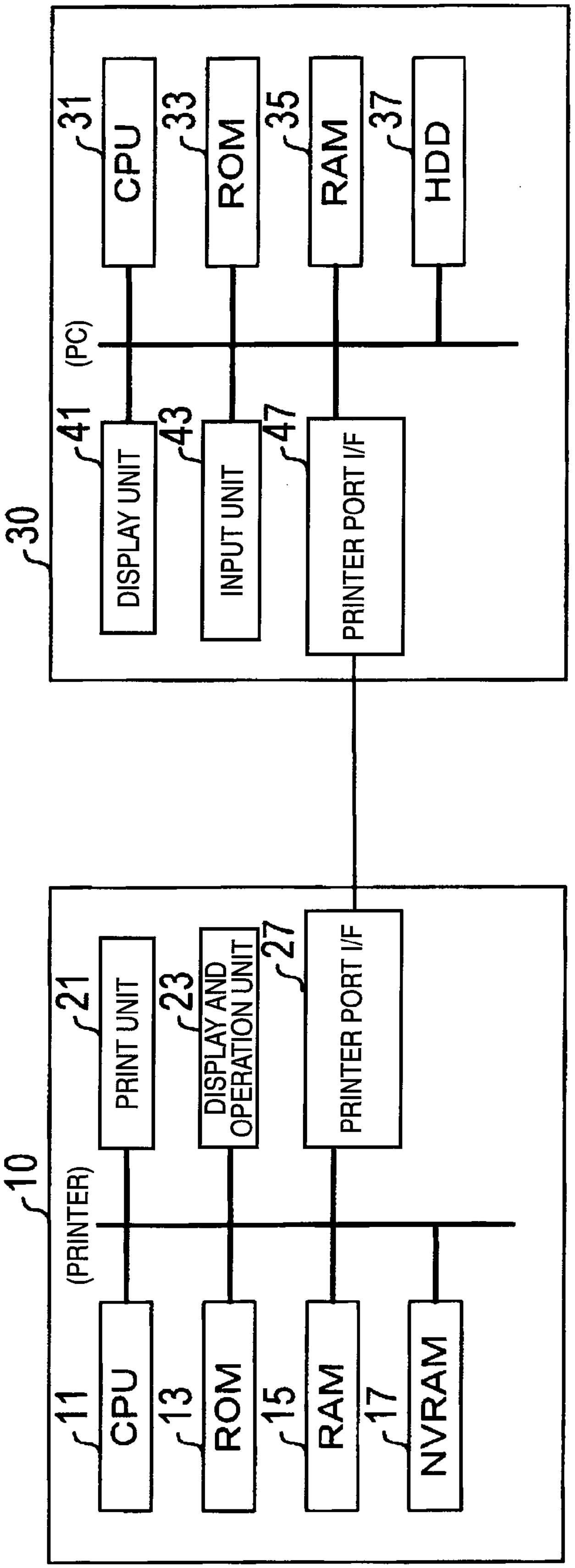
FIG. 1 is a block diagram to show a schematic configuration of a printer and a PC according to an exemplary embodiment of the present invention.

FIG. 1 is a block diagram to show the configurations of a printer 10 and a personal computer (PC) 30 according to an exemplary embodiment of the present invention for controlling the printer 10.

The printer 10 includes a CPU 11 for executing various programs to control units therein, a read only memory (ROM) 13 for storing the various programs executed by the CPU 11, a random access memory (RAM) 15 used as a work area at the program execution time by the CPU 11, a nonvolatile random access memory (NVRAM) 17 as data-rewritable nonvolatile memory for storing various setup data, a print unit 21 for printing an image based on job data input from the PC 30 on a recording medium under the control of the CPU 11, a display and operation unit 23 having a display unit (liquid crystal monitor) and an operation unit (key group) that can be operated by the user, and a printer port interface (LAN interface) 27 connected to a LAN.

The PC 30 includes a CPU 31 for executing various programs to control units therein, a ROM 33 for storing a boot program, and the like, executed by the CPU 31, a RAM 35 used as a work area at the program execution time by the CPU 31, a hard disk drive (HDD) 37 for storing programs of an operating system, application programs, a printer driver, and the like, and various data, a display unit 41 (liquid crystal monitor) for information display, an input unit 43 including a keyboard, a pointing device, and the like, that can be operated by the user, and a printer port interface (LAN interface) 47 connected to the LAN.

Next, restriction conditions will be described with reference to FIGS. 2A and 2B. FIG. 2A is a table listing types of restriction conditions. Each of the restriction conditions is defined by a combination of setup values. The PC 30 limits the setup value range so as not to satisfy any of the three restriction conditions shown in FIG. 2A.

In more particular, the combination A shown in FIG. 2A is "double-sided print ON and sheet size less than A4." This means that the PC 30 is adapted to prohibit a state in which double-sided print ON and sheet size less than A4 are set at the same time. The reason is that it is difficult to turn a sheet having a size less than A4 inside out to execute double-sided print.

The combination B is "double-sided print ON and poster print ON." This means that the PC 30 is adapted to prohibit a state in which poster print ON and double-sided print ON are set at the same time. The reason is that it is difficult to print with no margin to execute poster print at the double-sided print time.

The combination C is "sheet size less than A4 and tray other than manual tray." This means that the PC 30 is adapted to prohibit a state in which sheet size less than A4 and tray other than manual tray are set at the same time. The reason is that it is difficult to pick up a sheet having a size less than A4 in any tray other than the manual tray. The trays other than the manual tray included in the printer 10 are a first tray and a second tray.

Herein, the table shown in FIG. 2A is not actually stored in the hard disk drive 37, because it is hard to use the table in the format shown in FIG. 2A for processing. FIG. 2B shows the table in the format actually stored in the hard disk drive 37.

The table shown in FIG. 2B includes information related to "number," "restriction condition", "restriction set item group," and "display color." In the table, the restriction condition is defined by a condition setup value and a restriction setup value. That is, the two information shown in FIG. 2B are provided for restricting change in a setup value so that the value set as the restriction setup value is not set when the value defined as the condition setup value is set. A specific procedure will be described later with reference to FIG. 3. The number is used in operations for implementing that processing. The condition setup value is an example of a first setup value and the restriction setup value is an example of a second setup value.

A restriction set item group and a display color are associated with each restriction. In the restriction set item group, set items in which the condition setup value and the restriction setup value are set are shown. The display color is unique to each restriction and is assigned a color in order to easily identify the restriction, which is different from an original color (white, gray or the like). Next, processing using the table as the restriction conditions shown in FIG. 2B will be described.

Figure 3:
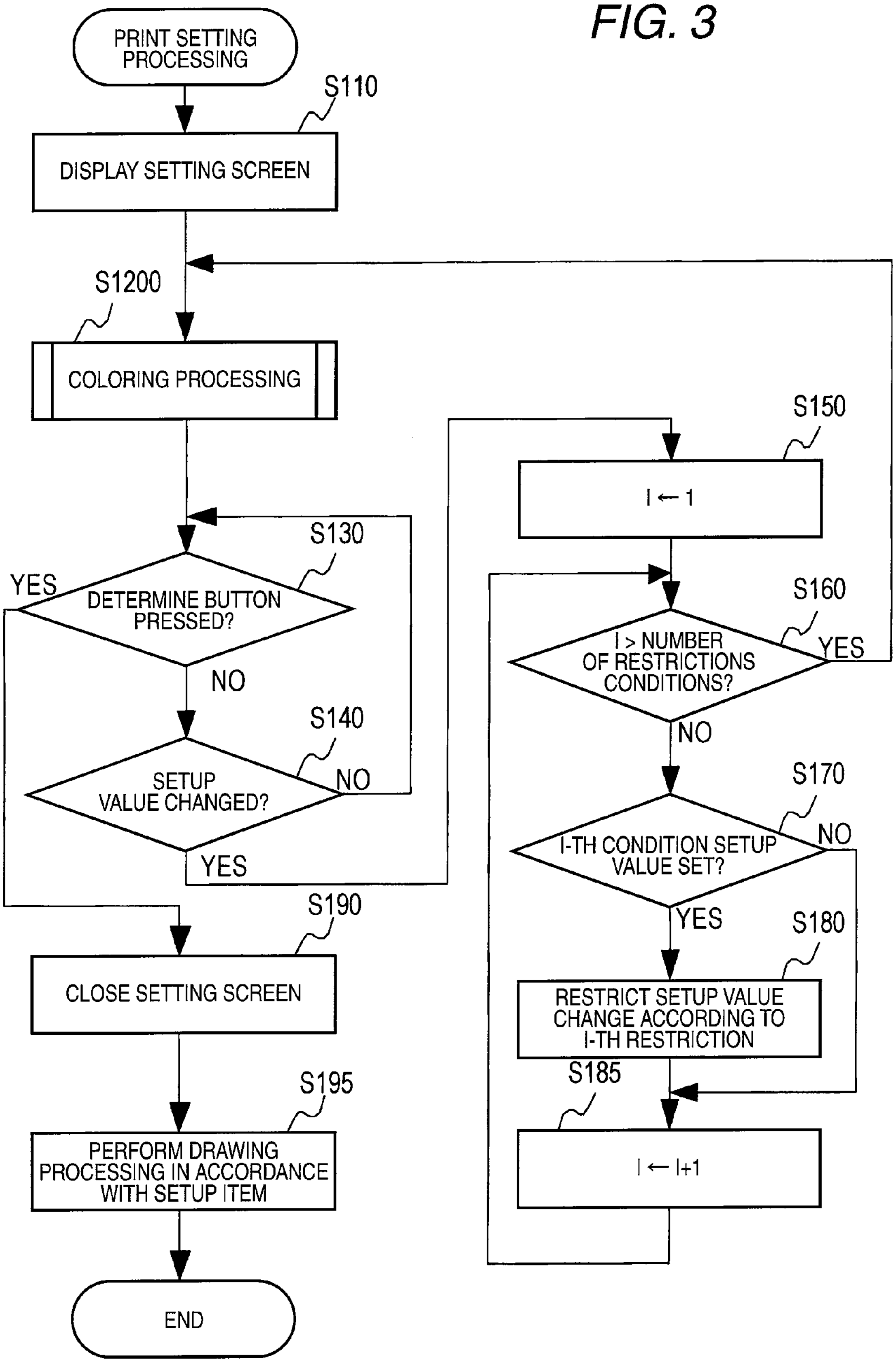
FIG. 3 is a flowchart to show print setting processing.

FIG. 3 is a flowchart to show print setting processing. This processing is executed subjectively by the CPU 31 and is implemented as a part of the program configuring the printer driver stored in the hard disk drive 37 described above. The print setting processing is started when a display command of a setting screen concerning print is received through the input unit 43.

Figures 4, 5:
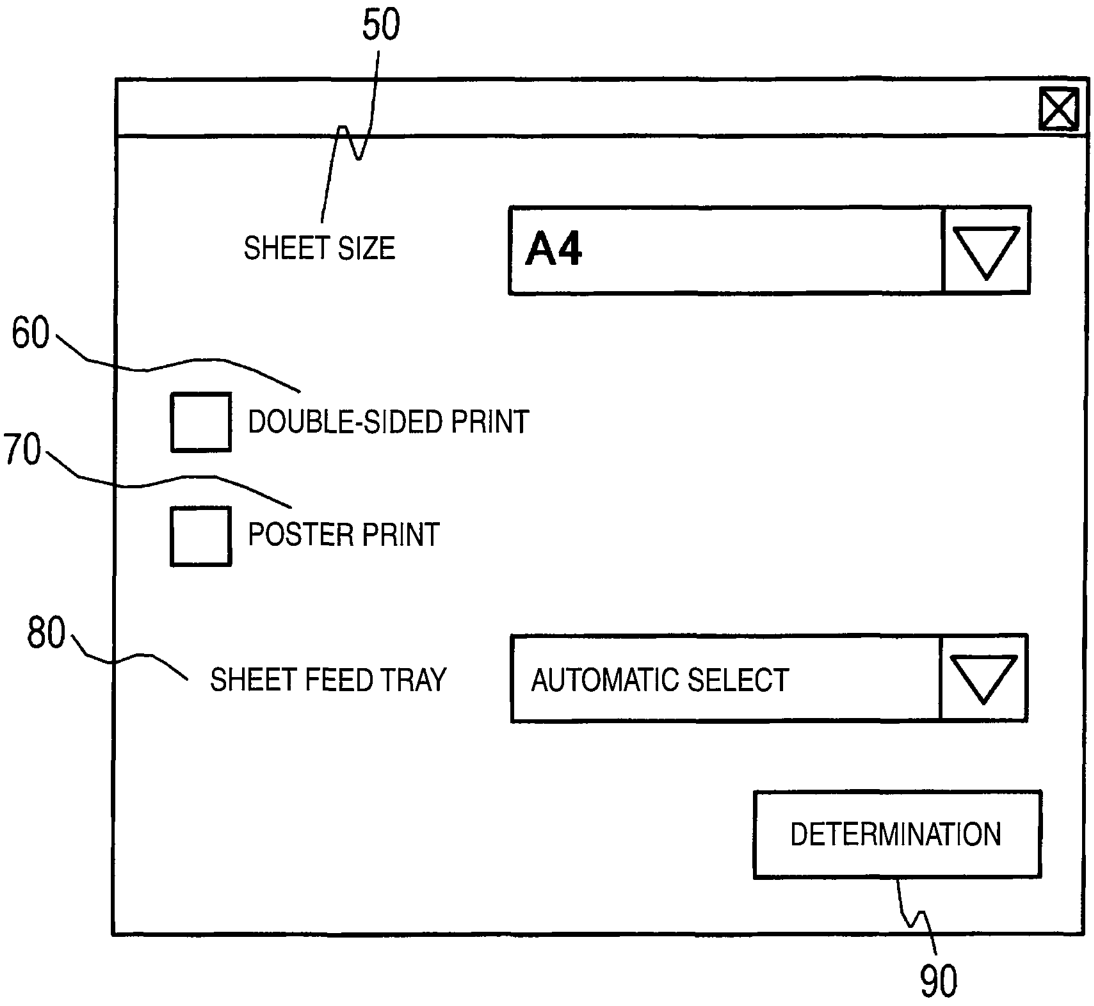
FIG. 4 is a drawing to show a setting screen based on initial values.
FIG. 5 is a table to show changed setup values.

At first, a setting screen is displayed on the display unit 41 (S110). FIG. 4 shows the setting screen. This setting screen is displayed on the display unit 41 and functions as a graphical user interface. Specifically, the user can set setup values for set items of a sheet size item 50, a double-sided print item 60, a poster print item 70, and a sheet feed tray item 80, respectively, through the input unit 43.

In the sheet size item 50, A4, A5, or the like, is set as a setup value. In the double-sided print item 60, ON or OFF is set as a setup value. If the double-sided print item 60 is set to ON and print is executed, print is executed on both sides of a sheet.

In the poster print item 70, ON or OFF is also set as a setup value. If the poster print item 70 is set to ON and print is executed, the portion assigned to each sheet is enlarged and printed so that the image to be printed is formed on a plurality of sheets as one set. In the sheet feed tray item 80, the first tray, the second tray, or the manual tray included in the printer 10 is set. This information is for determining the tray for feeding a sheet.

A determination button 90 is also displayed on the setting screen. That is, the CPU 31 executes processing of setting the setup values for the set items 50, 60, 70, and 80 in accordance with operation of the user to the setting screen through the input unit 43 until the user selects and operates the determination button 90 after the setting screen is displayed on the display unit 41. When the user selects the determination button 90 through the input unit 43, the CPU 31 executes print processing based on the combination of the setup values.

Initial values are defined as shown in FIG. 4, that is, A4 in the sheet size item 50, OFF in the double-sided print item 60, OFF in the poster print item 70, and automatic select (selection of the tray storing a sheet corresponding to the selected sheet size) in the sheet feed tray item 80. If the values are thus determined, all condition setup values described with reference to FIGS. 2A and 2B are avoided. That is, no restriction condition is satisfied.

Next, coloring processing is executed (S1200). This coloring processing is processing of coloring the restriction set item group based on the restriction condition. However, no restriction set item group is colored at the initial stage because the initial values avoid the condition setup values as described above. Then, the coloring processing will be described again after the condition setup value is changed in the following processing.

Next to the coloring processing, it is determined whether the determination button 90 is selected through the input unit 43 (S130). If it is determined that the determination button 90 is not selected through the input unit 43 (NO at S130), it is determined whether any of the values has been changed after the immediately preceding coloring processing (S140). The expression "immediately preceding" is used to mean that S140 applies to the latest coloring processing when the coloring processing is executed repeatedly.

If it is not determined that any of the values has been changed after the immediately preceding coloring processing (NO at S140), the process returns to S130. That is, the process waits until the determination button 90 is selected or until the setup value is changed.

Hereafter, it is assumed that the setup value is changed based on the information input through the input unit 43. FIG. 5 shows a specific example of the changed setup values. The sheet size is set to A5, the double-sided print is set to OFF, the poster print is set to ON, and the sheet feed tray is set to the manual tray. If the sheet size is used as the condition setup value, the restriction setup values are the double-sided print ON and any other tray than the manual tray.

If a setup value has been changed, the determination at S140 becomes YES. Then, one is stored in a counter I (S150). Then, it is determined that whether the counter I is greater than the number of the restriction conditions (S160). In the exemplar embodiment, since the number of the restrictions is three, it is determined whether the counter I is greater than three. In other words, it is determined whether the counter I is four.

If it is not determined that the counter I is greater than the number of the restriction conditions (NO at S160), it is determined whether the condition setup value contained in the I-th restriction condition is set in the setting screen as the setup value (S170).

If it is determined that the condition setup value contained in the I-th restriction condition is set in the setting screen as the setup value (YES at S170), change in the setup value is restricted so as to prohibit the user from setting the value corresponding to the restriction setup value through the setting screen in accordance with the restriction condition (S180) and the process proceeds to S185. S180 will be described with reference to FIG. 6A.

Figures 6A, 6B:
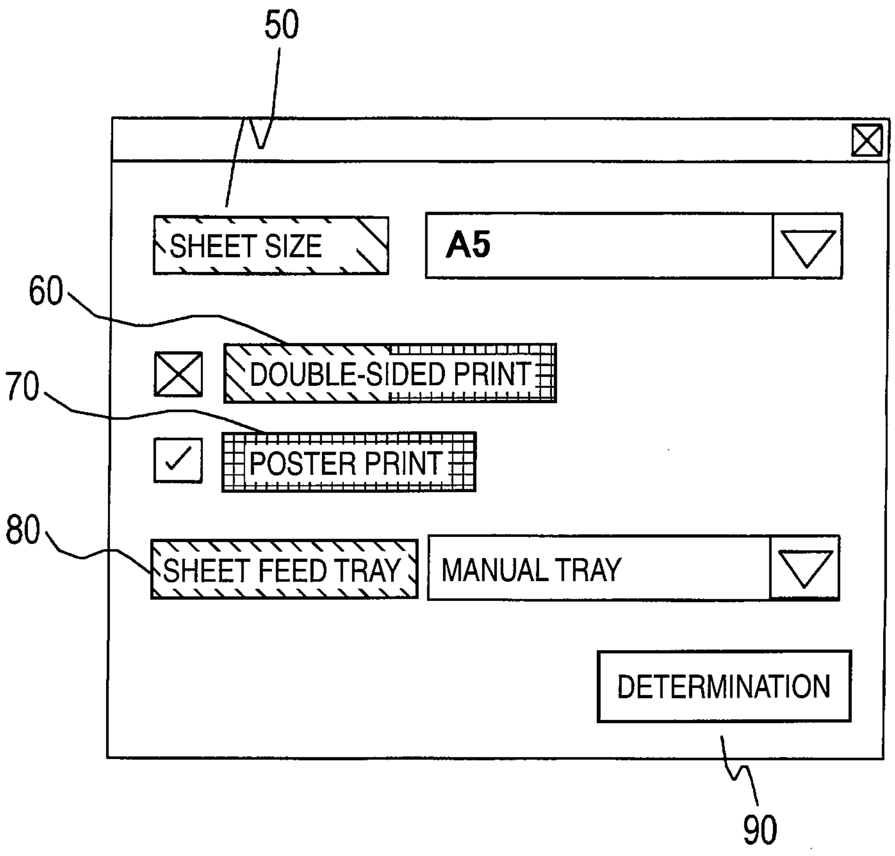
FIG. 6A is a drawing to show how set items are colored and FIG. 6B is a table to show a relationship between the set items and the coloring result.

In FIG. 6A, an X mark is displayed in the check box corresponding to the double-sided print item 60. The X mark is displayed as a result of Si80. That is, if the sheet size is set to less than A4, it is necessary to restrict setting so that the double-sided print item 60 is not set to ON and the sheet feed tray item 80 is not set to the setup value of any tray other than the manual tray as described above with reference to FIGS. 2A and 2B. Then, the printer driver is adapted to display the X mark so as not to accept input to change the setting of the check box to set the double-sided print item 60 to ON. This is an example of restriction unit.

Although not shown in the figures, when a pull-down menu corresponding to the sheet feed tray item 80 is displayed, the printer driver is adapted to gray out any tray other than the manual tray, such as the first tray and the second tray, and not to accept change of the setting.

Referring again to FIG. 3, if it is not determined that the condition setup value contained in the I-th restriction condition is set in the setting screen as the setup value (NO at S170), S180 is skipped and the process proceeds to S185. At S185, the counter I is incremented by one and the process returns to S160. That is, steps S170 to S185 are repeated until the counter I becomes greater than the number of the restriction conditions. If it is determined that the counter I is greater than the number of the restriction conditions (YES at S160), the process returns to S1200.

Figure 7:
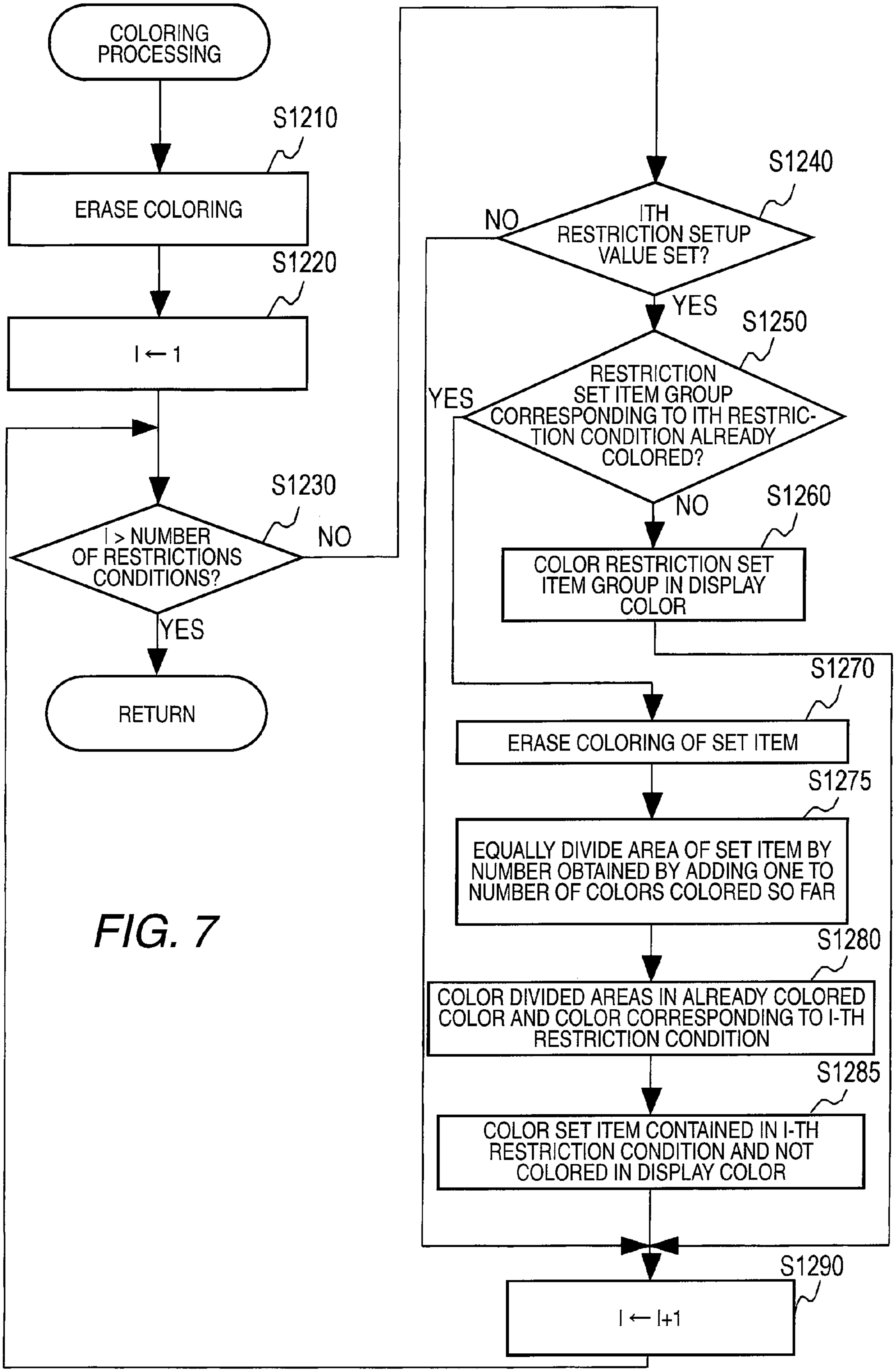
FIG. 7 is a flowchart to show coloring processing.

When the process thus returns to S1200, coloring is executed in the coloring processing. Then, the coloring processing will be described with reference to FIG. 7. FIG. 7 is a flowchart to show the coloring processing. First, the present coloring is all erased (S1210). Next, one is assigned to the counter I (S1220), and it is determined whether the counter I is greater than the number of the restriction conditions is determined (S1230).

If it is not determined that the counter I is greater than the number of the restriction conditions (NO at S1230), it is determined whether the condition setup value contained in the I-th restriction is set (S1240). For the example shown in FIG. 5, the condition setup values of the restriction conditions having the numbers 2 and 3 are set. Therefore, when the counter I is 2 or 3, the determination at S1240 is YES; when the counter I is 1, the determination at S1240 is NO.

If it is determined that the condition setup value contained in the I-th restriction is not set (NO at S1240), coloring is skipped and the process proceeds to S1290. On the other hand, if it is determined that the condition setup value contained in the I-th restriction condition is set (YES at S1240), it is determined whether any item in the restriction set item group corresponding to the I-th restriction has been already colored (S1250). In FIG. 5, both of the restriction set item groups corresponding to the numbers 2 and 3 contain the double-sided print. Therefore, when the counter I is 3, the determination at S1250 becomes YES since coloring of the double-sided print item 60 is executed when the counter I is 2.

If it is determined that no item in the restriction set item group corresponding to the I-th restriction condition has been colored (NO at S1250), a background of each item in the restriction set item group corresponding to the I-th restriction condition is colored in the corresponding display color (S1260) and the process proceeds to S1290.

On the other hand, if it is determined that any item in the restriction set item group corresponding to the I-th restriction has been already colored (YES at S1250), coloring of the colored set item is erased (S1270). For the example shown in FIG. 5, green colored when the counter I is 2 is erased when the counter I is 3.

Next, the area of the colored item is equally divided by the number obtained by adding one to the number of the colors colored so far (S1275). For the example shown in FIG. 5, in the display area of the double-sided print item 60, the number of the colors colored so far is one and thus the display area is divided into two equal sections.

The backgrounds of the divided areas are colored in the already colored color and the display color corresponding to the I-th restriction condition (S1280). For the example shown in FIG. 5, the backgrounds are colored in green corresponding to the number 2 and blue corresponding to the number 3. Which area is to be colored and which color to be used is as desired by the designer. For example, the color corresponding to the restriction condition having the smaller number may be placed to the left.

If a plurality of set items are involved, steps S1270 to S1280 are executed for each of the set items. The background of the set item which is contained in the I-th restriction condition but not colored is colored in the corresponding display color (S1285). For the example shown in FIG. 5, the poster print item 70 is colored in blue. Next, the counter I is incremented by one (S1290) and the process returns to S1230.

If it is determined that the counter I is greater than the number of the restriction conditions (YES at S1230), the coloring processing ends, and this subroutine returns to the print setting processing and the process proceeds to S130.

The coloring result of the coloring processing will be described with reference to FIGS. 6A and 6B. FIG. 6B is a table of the coloring result of the set items. This table shows that the poster print item 70 is colored in blue and the double-sided print item 60 is colored in green and blue. FIG. 6A shows how the set items displayed on the display unit 41 are colored. Herein, green is represented by longitudinal and lateral lines and blue is represented by slanting lines. The left half and the right half of the double-sided print item 60 are colored in green and blue respectively according to S1270 to S1280 as described above.

Thus, the processing of restricting setup value change (S150 to S185) and the coloring processing (S1200) are executed each time the setup value is changed until the determination button 90 is selected. If it is determined that the determination button 90 is selected through the input unit 43 (YES at S130), the setting screen is closed (S190) and drawing processing is performed for the data to be printed according to the setup values (S195). Then, the print setting processing ends.

Figures 8A, 8B:
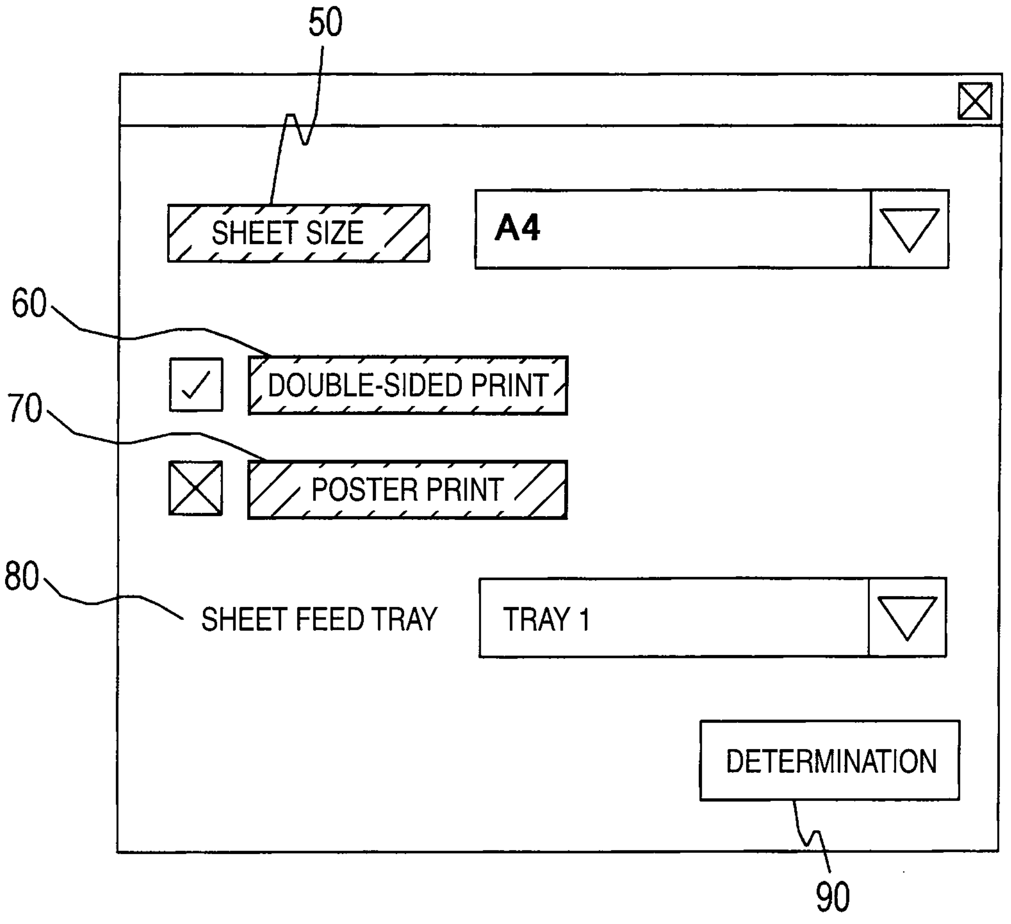
FIG. 8A is a table to show a relationship among the set items, the setup values, and the coloring result
FIG. 8B is a drawing to show how the set items are colored.

FIG. 8A shows a different setup value combination from that in FIG. 5. The sheet size item 50 is set to A4, the double-sided print item 60 is set to ON, the poster print item 70 is set to OFF, and the sheet feed tray item 80 is set to the first tray. If the print setting processing is executed based on the combination, the sheet size item 50, the double-sided print item 60, and the poster print item 70 are colored in red. On the other hand, the sheet feed tray item 80 is not colored.

FIG. 8B shows the print setting screen reflecting the coloring result based on the combination shown in FIG. 8A. Herein, red is represented by slanting lines. An X mark is displayed in the check box of the poster print item 70. The X mark is displayed according to the processing of restricting setup value change (S150 to S185) since the restriction setup value corresponding to double-sided print ON (number 1) is poster print ON.

As described above, according to the print setting screen and the coloring processing contained in the print setting screen, the relationship among the setup items in the restriction conditions can be displayed in an easily understandable manner for the user.

Modified Example 1

Figure 9:
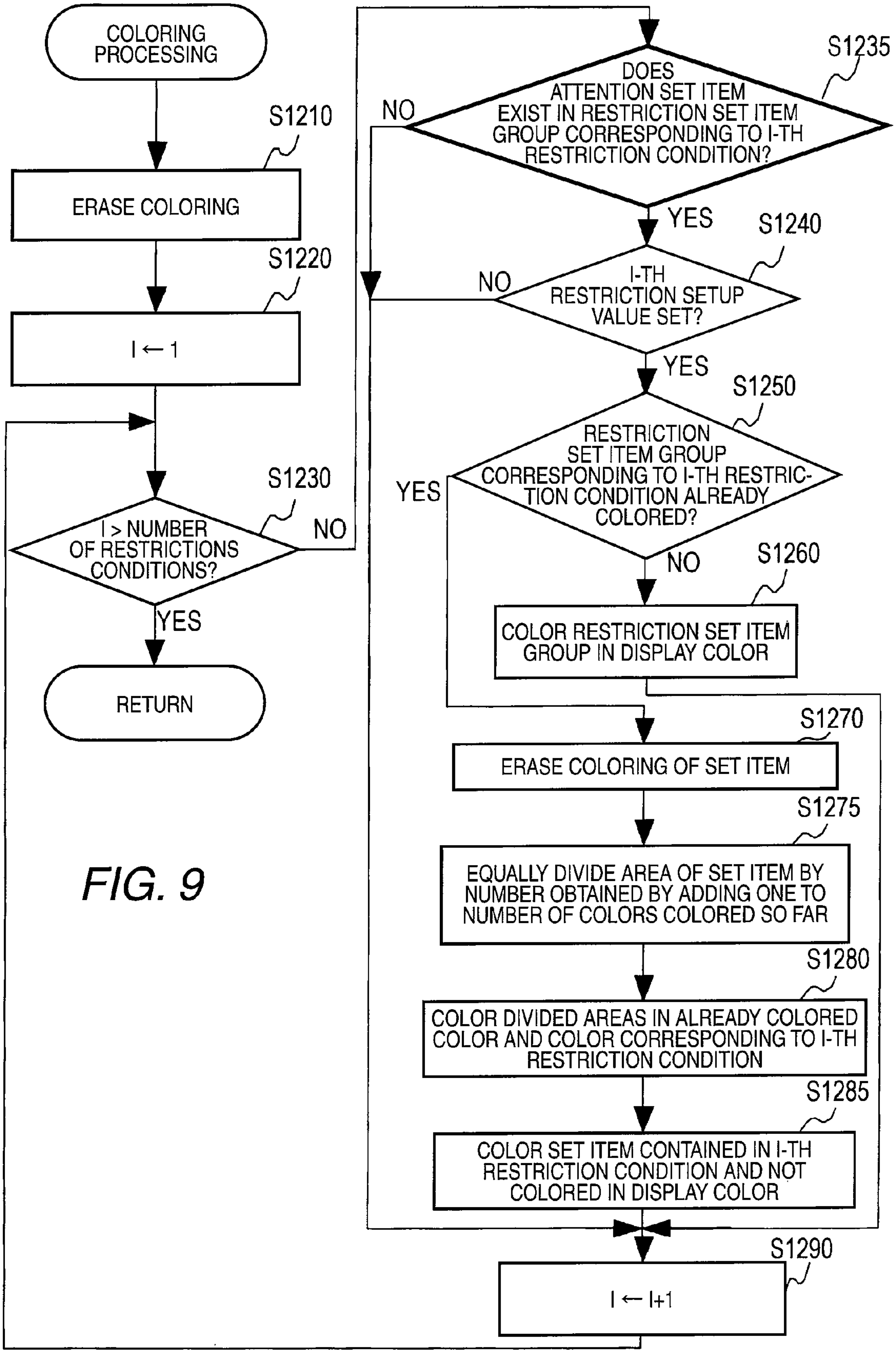
FIG. 9 is a flowchart to show modified coloring processing.

FIG. 9 shows a modified example of the coloring processing. Herein, only modification from the above described exemplary embodiment will be described. The modification is that S1235 is added preceding S1240 after NO at S1230. If the determination at S1230 is NO, it is determined whether an attention set item is contained in the restriction set item group corresponding to the I-th restriction condition (S1235). This operation is an example of selection unit.

The attention set item is a set item for which setup value seems to be changed from current state. Whether the setup value seems to be changed from current state can be determined according to any of several determination methods. For example, when the position of a cursor is within or in the vicinity of the display area of a set item, it can be determined that a setup value for the set item seems to be changed from the current state. The cursor is positioned on the screed displayed on the display unit 41 with using a pointing device as the input unit 43 and is used for performing a function of the graphical user interface.

For a set item in which setup values are displayed as a pull-down menu, the set item in which a pull-down menu is currently displayed can be determined as the attention set item.

If it is determined that an attention set item is contained in the restriction set item group corresponding to the I-th restriction (YES at S1235), the process proceeds to S1240. On the other hand, if it is determined that no attention set item is contained in the restriction set item group corresponding to the I-th restriction (NO at S1235), the process proceeds to S1290. That is, only the attention set item is colored.

Figures 10A, 10B:
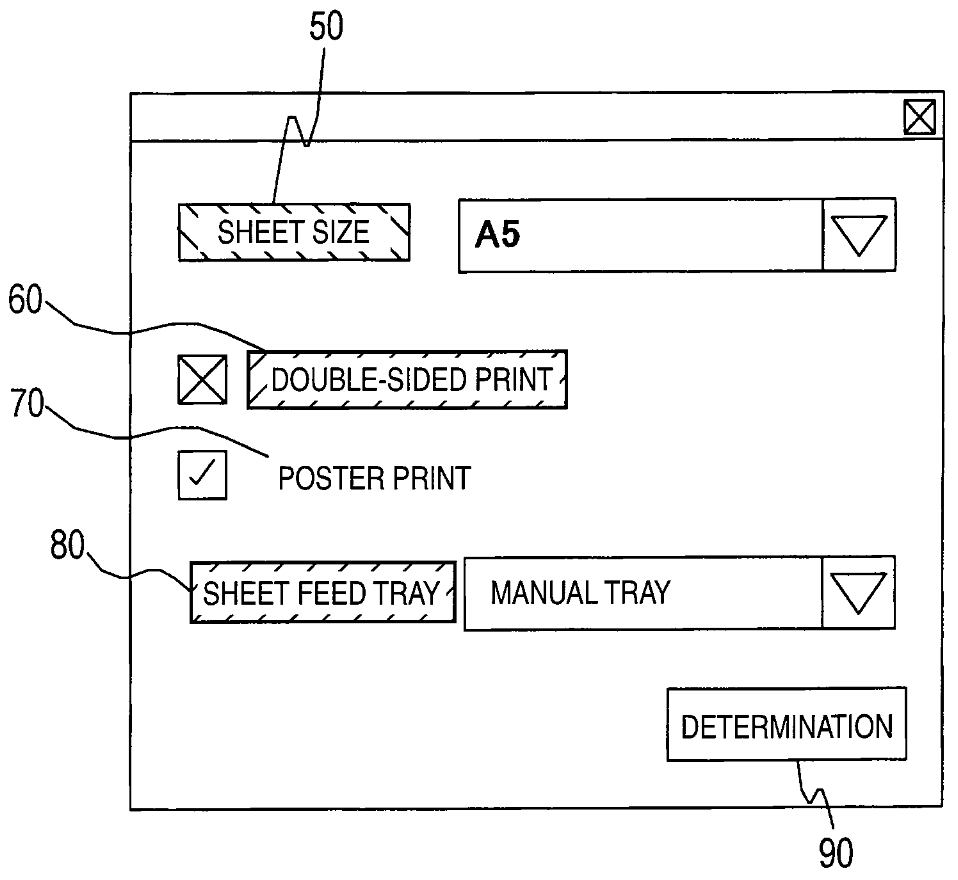
FIGS. 10A and 10B are drawings to show a setting screen colored according to the modified coloring processing.

FIG. 10A shows the set item coloring result based on the setup values shown in FIG. 5 according to the coloring processing in modified example 1. FIG. 10B shows the setting screen with the set items colored. The attention set item is the sheet size item 50. Then, the restrictions corresponding to the restriction set item group containing the sheet size item 50 become numbers 1 and 2. However, double-sided print ON corresponding to number 1 is not set. Therefore, the items are colored according to the content of number 2. That is, the sheet size item 50, the double-sided print item 60, and the sheet feed tray item 80 are colored in green. Herein, green is represented by slanting lines.

It can be seen that the information amount according to the coloring is small in FIG. 10B as compared with FIG. 6A, because the relation between the double-sided print item 60 and the poster print item 70 is not shown by coloring. The coloring may be redundant information for the user who is about to change the sheet size. Therefore, easily understandable display may be achieved according to the coloring processing in modified example 1.

Modified Example 2

FIGS. 11A to 11D show a setting screen according to a modified example 2. This setting screen enables the user to switch the set item to be displayed using a tab. That is, all set items are not displayed and only the set items associated with an effective tab are displayed. That is, the set items associated with an ineffective tab are not displayed.

Figure 11A:
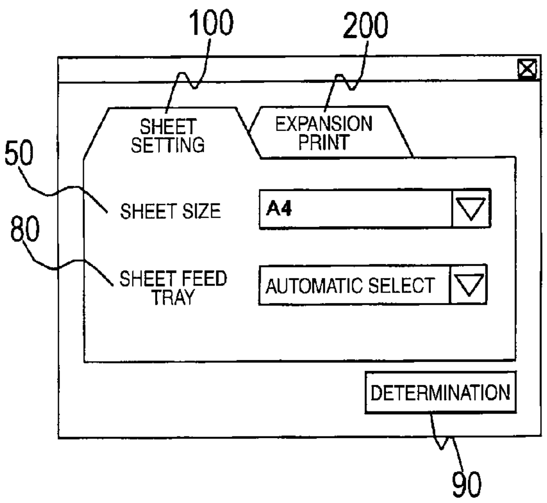
FIGS. 11A and 11B are drawings to show set items associated with a tab and FIGS. 11C and 11D are drawings to show how set items and tabs are colored.
Figure 11B:
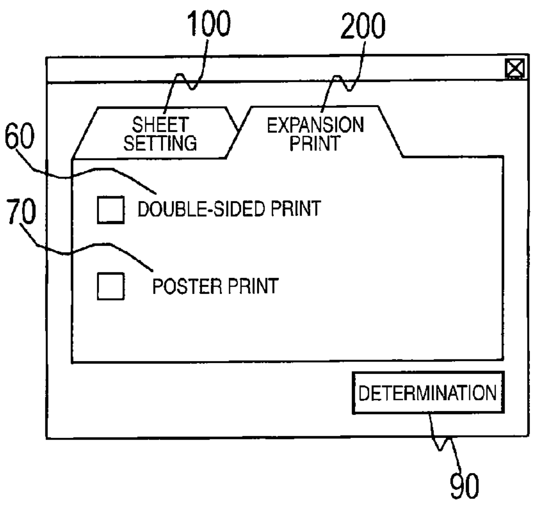
Figure 11C:
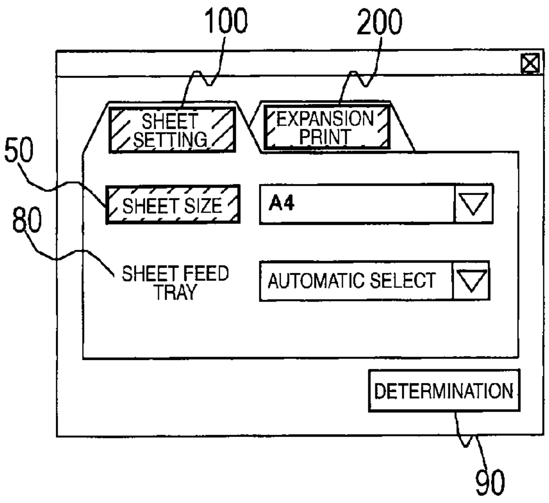
Figure 11D:
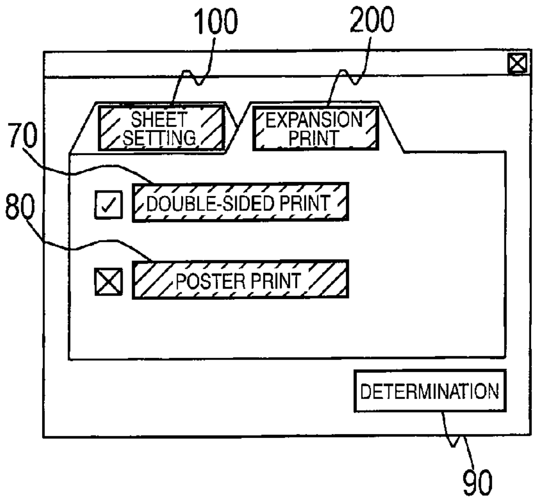

FIG. 11A shows that the set items of the sheet size item 50 and the sheet feed tray item 80 are associated with a sheet setting tab 100. FIG. 11B shows that the double-sided print item 60 and the poster print item 70 are associated with an expansion function tab 200. The effective tab and the ineffective tab are switched based on information entered through the input unit 43.

In the meantime, to display the set items using the tab, the user cannot see the set items associated with the ineffective tab if the set items are colored according to coloring processing. Therefore, the purpose of displaying the restriction conditions in an easily understandable manner for the user may be unable to be accomplished.

In the modified example 2, the tab is colored. Specifically, the tab can be colored by performing processing obtained by changing several steps in the coloring processing according to the above exemplary embodiment. That is, in S1250, it is determined whether any item in the set item associated with effective tab of set items contained in restriction set item group corresponding to the I-th restriction or ineffective tab associated with set item contained in the restriction set item group has been already colored. Additionally, in S1260, a background of each item associated with effective tab of set items contained in restriction set item group corresponding to the I-th restriction condition or ineffective tab associated with set item contained in the restriction set item group is colored in the corresponding display color. Further, in S1270, coloring of the colored set item or ineffective tab is erased, and in S1285, the background of the set item or ineffective tab which is contained in the I-th restriction condition but not colored is colored in the corresponding display color.

If the tab is thus colored, easily understandable display for the user can be achieved even if the set item to be displayed in color is hidden.

Other Modifications

In the coloring processing, the determination at S1240 may always be YES. In so doing, coloring is performed based on the restriction condition regardless of the setup value. The display in this manner may be easier to see in some instances. The time zone may be divided and a different color may be displayed for each divided time zone without dividing the area and coloring each divided area. The display in this manner may be easier to see when the set item display area is small, or the like.

For print processing, the determination button 90 may be grayed out so that the user cannot select the determination button 90 in a state in which a setup value combination satisfying the restriction condition is set although the user can set and enter such combination.

Characters may be colored in stead of coloring a background or may be displayed in boldface or italic type. The inventive concept of the present invention may be applied to a copier, a multiple function device, and the like, rather than to a PC.

While the present invention has been shown and described with reference to certain exemplary embodiments thereof, it will be understood by those skilled in the art that various changes in form and details may be made therein without departing from the spirit and scope of the invention as defined by the appended claims.

The present invention provides illustrative, non-limiting embodiments as follows:

(1) A display control apparatus comprises: a display control unit which controls a display to display a setting screen indicating a plurality of set items; a setting unit which sets setup values for the plurality of set items displayed on the display, respectively; a processing unit which executes processing according to a combination of the setup values set by the setting unit; and a restriction unit which restricts setting the setup values by the setting unit so as not to satisfy a restriction condition, which is a combination of a plurality of setup values, wherein the restriction condition is determined so as to prohibit the processing unit from executing the processing, wherein the display control unit controls the display to display a restriction item group in a first mode, the restriction item group including set items corresponding to the setup values in the restriction condition, and to display set items other than the restriction item group in a second mode different from the first mode.

The display control apparatus according to (1) can inform the user why the setting operation is restricted in an easily understandable manner, because the display control apparatus can display not only the item whose setting is restricted, but also the set item causing the restriction to occur in the first mode. Therefore, unlike the related arts, the display control apparatus enables the user to easily understand which set items are involved in the restriction.

In the display control apparatus of (1), a plurality of restriction conditions may be determined, the first mode may include a plurality of display modes for the plurality of restriction conditions, respectively, the plurality of display modes being different from one another, and the display control unit may control the display to display each of restriction item groups for the plurality of restriction conditions in the corresponding display mode as the first mode.

The display control apparatus according to (2) enables the user to easily understand which set items restrict the setting operation, because when a plurality of restriction set item groups exist, they are represented in different modes.

(3) The display control apparatus of (2) may further comprise a selection unit which selects one of the set items displayed on the display. The display control unit may control the display to display only a restriction item group including the one of the set items selected by the selection unit among the plurality of restriction item groups, in the first mode and controls the display to display a restriction item group not including the one of the set items in the second mode.

The display control apparatus of (3) enables the user to more easily check the condition, because only the restriction item group considered to be required for the user can be displayed in the first mode. For example, if the set item corresponding to the setup value set through the setting screen and the set item whose value setting is restricted because of the setup item are represented in the first mode, the relationship therebetween can be easily understood.

(4) In the display control apparatus of (2) or (3), if a same set item is included in the restriction item groups for different restriction conditions, the display control unit may control the display to display the same set item in a third mode, and the third mode may have features of the display modes for the different restriction conditions.

According to the display control apparatus of (4), if one set item is contained in the restriction set item groups for the different restriction conditions, display as to which set items are involved in the condition can be produced in an easily understandable manner.

(5) In the display control apparatus of (4), in the third mode, an area for displaying the same set item in the setting screen includes a plurality of areas by the number of the restriction item groups including the same set item, and the display control unit may control the display to display, in the third mode, each of the areas in the display mode for the restriction condition corresponding to respective one of the restriction item groups including the same set item.

According to the display control apparatus of (5), the restriction item groups of one set item in the different restriction conditions can be displayed in an easily understandable manner.

(6) In the display control apparatus of any one of (1) to (5), the setup values for the set items in the combination as the restriction condition may be classified into either one of a first setup value and a second setup value. The restriction unit may prohibit the setting unit from setting the second setup value if the first setup value is set by the setting unit. The display control unit may control the display to display the restriction item group corresponding to the restriction condition including a first setup value set by the setting unit, in the first mode, and to display the restriction item group corresponding to the restriction condition including a first setup value not set by the setting unit, in the second mode.

The display control apparatus of (6) can produce display more convenient for the user. For the user, there is no problem if the user can make any desired setting. Therefore, it is sufficient to display information concerning the condition only if a setting is restricted. The display control apparatus of (6) can execute such display.

(7) In the display control apparatus of any one of (1) to (6), each of the set items may be associated with any one of a plurality of tabs, and the setting unit may set any one of the tabs as an effective tab and sets any other tab than the effective tab as an ineffective tab. The display control unit may control the display to display a dialog box including the set item associated with the effective tab and a specific ineffective tab of the ineffective tabs and not to display the set items associated with the ineffective tabs, the specific ineffective tab being associated with any of the set items to be displayed in the first mode if the specific ineffective tag is set as the effective tag. The display control unit may control the display to display the specific ineffective tab in the same mode as the first mode used in displaying any of the set items associated with the specific ineffective tab.

The display control apparatus of (7) can produce display in an easily understandable manner as the tab display mode changes if the set item not displayed by the tab function relates to the restriction condition.

(8) In the display control apparatus of any one of (1) to (7), the setting unit may set the setup values for the plurality of set items based on information entered through the setting screen displayed on the display.

(9) In the display control apparatus of (1), the setting unit may set the setup value for each of the plurality of set items from among a plurality of selectable values, and the restriction condition may be the combination of the plurality of setup values from among the plurality of selectable values for the plurality of set items.

(10) In the display control apparatus of (3), the selection unit selects an attention set item as the one of the set items, and the attention set item corresponds to a set item, a setup value for which is to be changed.

(11) A display control program is a program for causing a computer to implement the functions of the units of the display control apparatus of (1). Therefore, the display control program provides similar advantages to those of the display control apparatus of (1).

What is claimed is:

1. A display control apparatus comprising:

a processor; and memory storing computer-readable instructions that, when executed, cause the processor to perform the following:

control a display to display a setting screen indicating a plurality of printing set items;

set printer setup values for the plurality of printing set items displayed on the display, respectively;

store a data table identifying a plurality of prohibited combinations of printing settings for the printer setup values;

cause execution of processing according to a combination of the printer setup values; and restrict setting the printer setup values so as not to satisfy any of the prohibited combinations of printing settings for the printer setup values, wherein the prohibited combinations of printing settings are determined so as to prohibit the execution of the processing, and wherein each prohibited combination of printing settings is defined by a condition setup value and a restriction setup value, wherein restricting the setting restricts a change in a printer setup value so that a first value set as the restriction setup value is not set when a second value defined as the condition setup value is set, wherein controlling the display controls the display to display a printing restriction set item group in a first mode, the printing restriction set item group including all printing set items corresponding to the condition setup value and the restriction setup value, and to display set items other than the printing restriction set item group in a second mode different from the first mode, wherein the printer setup value for each of the plurality of printing set items are set from a plurality of selectable values, wherein the prohibited combinations of printing settings are further defined by the printer setup values for the plurality of printing set items, wherein each of the set items is associated with any one of a plurality of tabs, wherein the instructions further include instructions to set any one of the tabs as an effective tab and set any other tab than the effective tab as one or more ineffective tabs, wherein the instructions further include instructions to control the display to display (i) a dialog box including the set item associated with the effective tab and (ii) a specific ineffective tab of the one or more ineffective tabs, and not to display the set items associated with the one or more ineffective tabs, the specific ineffective tab being associated with any of the set items to be displayed in the first mode if the specific ineffective tab is set as the effective tab, and wherein the instructions further include instructions to control the display to display the specific ineffective tab in the same mode as the first mode used in displaying any of the set items associated with the specific ineffective tab, and wherein the memory further stores instructions that, when executed by the processor, cause the display of all printing set items corresponding to the restriction setup value, the display of the effective tab and the display of the specific ineffective tab in the first mode in response to setting of the condition set up value that defines the prohibited combination of printing setting with the restriction setup value.

2. The display control apparatus according to claim 1, wherein a plurality of prohibited combinations of printing settings are determined, each prohibited combination being associated with one or more restriction set item groups, wherein the first mode includes a plurality of display modes for the plurality of prohibited combinations of printing settings, respectively, the plurality of display modes being different from one another, and wherein the instructions further include instructions to control the display to display each restriction set item group of the one or more restriction set item groups in the one or more display modes corresponding to the one or more prohibited combinations of printing settings associated with the restriction set item group as the first mode.

3. The display control apparatus according to claim 2, wherein the memory stores additional computer-readable instructions that, when executed, further cause the processor to select one of the set items displayed on the display, wherein the instructions further include instructions to control the display to display only a restriction set item group including the selected one of the set items, in the first mode and control the display to display a restriction set item group not including the selected one of the set items in the second mode.

4. The display control apparatus according to claim 2, wherein if a same set item is included in the restriction set item groups for different prohibited combinations of printing settings, the display control apparatus controls the display to display the same set item in a third mode, and wherein the third mode has features of the display modes for the different prohibited combinations of printing settings.

5. The display control apparatus according to claim 4, wherein, in the third mode, an area for displaying the same set item in the setting screen includes a plurality of areas by the number of the restriction set item groups including the same set item, and wherein the display control apparatus controls the display to display, in the third mode, each of the areas in the display mode for the prohibited combinations of printing settings corresponding to respective one of the restriction set item groups including the same set item.

6. The display control apparatus according to claim 1, wherein the setup values for the set items in the prohibited combinations of printing settings are classified into either one of a first setup value and a second setup value, wherein the instructions further include instructions to refrain from setting the second setup value if the first setup value is set, and to control the display to display the restriction set item group corresponding to the prohibited combinations of printing settings including a first setup value that is set, in the first mode, and to display the restriction set item group corresponding to the prohibited combinations of printing settings including a first setup value that is not set, in the second mode.

7. The display control apparatus according to claim 1, wherein the instructions further include instructions to set the setup values for the plurality of set items based on information entered through the setting screen displayed on the display.

8. The display control apparatus according to claim 3, wherein the instructions further include instructions to select an attention set item as the one of the set items, and wherein the attention set item corresponds to a set item, a setup value for which is to be changed.

9. A non-transitory computer-readable medium having computer-readable instructions stored thereon that, when executed, cause a computer to:

control a display to display a setting screen indicating a plurality of printing set items;

set printer setup values for the plurality of printing set items displayed on the display;

cause execution of processing according to a combination of the set printer setup values; and restrict setting the printer setup values by a setting operation so as not to satisfy a prohibited combination of printing settings for the printer setup values, wherein the prohibited combination is determined so as to prohibit causing execution of the processing, wherein the prohibited combination is defined by a condition setup value and a restriction setup value, wherein the restricting includes restricting change in a printer setup value so that a first value set as the restriction setup value is not set when a second value defined as the condition setup value is set, wherein the controlling controls the display to display a printing restriction set item group in a first mode, the printing restriction set item group including all set items corresponding to the condition setup value and the restriction setup value, and to display set items other than the restriction set item group in a second mode different from the first mode, wherein the setting of the printer setup value for each of the plurality of printing set items is set from a plurality of selectable values, wherein the prohibited combination is defined by the printer setup values for the plurality of set items, wherein each of the set items is associated with any one of a plurality of tabs, wherein the instructions further include instructions to set any one of the tabs as an effective tab and set any other tab than the effective tab as one or more ineffective tabs, wherein the instructions further include instructions to control the display to display (i) a dialog box including the set item associated with the effective tab and (ii) a specific ineffective tab of the one or more ineffective tabs, and not to display the set items associated with the one or more ineffective tabs, the specific ineffective tab being associated with any of the set items to be displayed in the first mode if the specific ineffective tab is set as the effective tab, wherein the instructions further include instructions to control the display to display the specific ineffective tab in the same mode as the first mode used in displaying any of the set items associated with the specific ineffective tab, and wherein the instructions further include instructions that cause the display of all printing set items corresponding to the restriction setup value, the display of the effective tab and the display of the specific ineffective tab in the first mode in response to setting of the condition set up value that defines the prohibited combination of printing setting with the restriction setup value.

* * * * *